(No Model.)

J. A. WHITE.
EXPANDING PULLEY.

No. 304,885. Patented Sept. 9, 1884.

WITNESSES:
A. P. Grant,
W. F. Kircher

INVENTOR:
J. Atwood White,
BY John A. Diedersheim
ATTORNEY.

UNITED STATES PATENT OFFICE.

J. ATWOOD WHITE, OF PHILADELPHIA, PENNSYLVANIA.

EXPANDING PULLEY.

SPECIFICATION forming part of Letters Patent No. 304,885, dated September 9, 1884.

Application filed August 31, 1883. (No model.)

*To all whom it may concern:*

Be it known that I, J. ATWOOD WHITE, of the city and county of Philadelphia, State of Pennsylvania, have invented a new and useful Improvement in Expanding Pulleys, which improvement is fully set forth in the following specification and accompanying drawings, in which—

Figure 1:
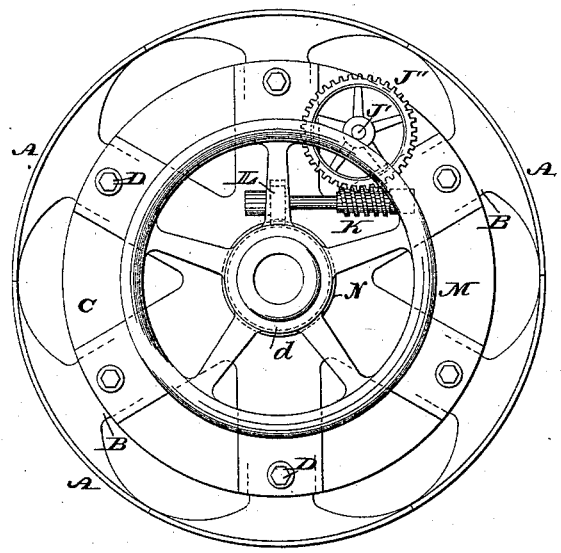
Figure 2:
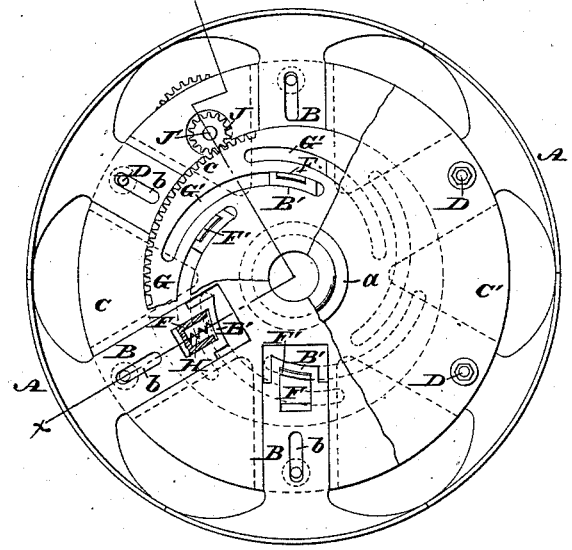
Figure 3:
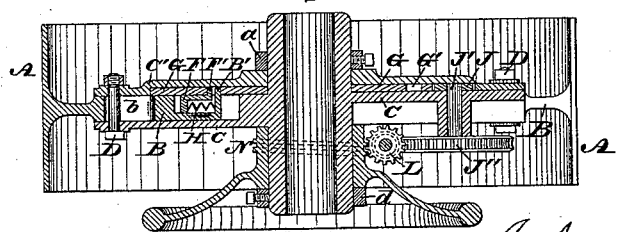

Figure 1 is a side elevation of an expanding pulley embodying my invention. Fig. 2 is a view of the opposite side thereof, partly broken away and partly sectional. Fig. 3 is an irregular section thereof in line $x\,x$, Fig. 2.

Similar letters of reference indicate corresponding parts in the several figures.

My invention consists of an expanding pulley provided with means whereby the sectional periphery may be maintained true and rattling prevented.

It also consists of means for changing the adjustment of the periphery during the rotation of the pulley without stopping the same, and providing self-locking gearing therefor.

Referring to the drawings, A represents the peripheral sections or segments of the pulley, and B the radial arms thereof.

C C' represent circular heads, between which the arms B are fitted, the head C being cast or formed with the hub of the pulley and the head C' encircling said hub, and retained in position by means of a collar, $a$, on the hub. The two heads are connected by bolts D D, which pass through openings in the periphery of said heads, and radial slots $b$, formed in the arms B, the latter being permitted to move freely between the heads. The inner end of each arm B is formed with a lip, B', adjacent to which is a recess to receive a sliding piece, F, the inner end of which is formed with a lip, F', the lips B' F' extending in planes parallel with the axis of the pulley.

G represents a disk which rotatingly encircles the hub of the pulley, and is located between the head C' and arms B, the same being formed with spiral slots or grooves G', to receive the lips B' F' of the arms B and pieces F.

H represents springs, which are fitted between the pieces F and inner ends of the arms B, the effect whereof is to press the lips B' F' in opposite directions firmly against the walls of the slots G', and continue such action as the lips and slots wear in service, thus always preventing rattling of the lips in said slots.

J represents a pinion, which is mounted on a shaft, J', whose bearings are on one or both of the heads C C', and meshes with a toothed portion, $c$, of the periphery of the disk G, said shaft also carrying a worm-wheel, J'', with which engages a worm, K, the shaft whereof carries a worm-wheel, L, and has its bearings on one of the heads, C C'.

On the hub of the pulley is loosely fitted a hand-wheel, M, being retained in position by a collar, $d$, and on the hub of said wheel is formed or secured a worm, N, which engages with the worm-wheel L. It will be seen that by operating the hand-wheel M in one direction the disk G, owing to the intermediate gearing, will be operated, the effect of which is to force out the arms B and separate segments A, thus expanding the pulley. By operating the hand-wheel in the reverse direction the arms B are withdrawn, and the segments consequently closed, whereby the pulley is contracted. As the hand-wheel rotates with the pulley, although loosely connected with the hub thereof, the pulley, when running, may be expanded by holding said wheel, whereby the gearing intermediate of the same and the disk G is operated and said disk rotated; or by throwing around the hand-wheel in the proper direction, so that it rotates more rapidly than the pulley, the pulley is caused to contract; or the contraction may be caused by holding the wheel and the expansion by throwing around the hand-wheel, as is evident, both operations being accomplished without stopping the pulley. By the employment of the worm and worm-wheel gearing J'' K, the disk becomes locked immediately after said gearing is operated in either direction, thus avoiding the employment of independent locking or fastening devices. Furthermore, by the use of worm-gearing J'' K and the worm-gearing L N, I provide for delicate adjustments of the pulley, owing to the slow movements that are imparted to the disk by the operation of the hand-wheel M.

Having thus described my invention, what I claim as new, and desire to secure by Letters Patent, is—

1. In an expanding pulley, movable radial arms, and a rotary disk with spiral slots or grooves, with which said arms engage, provided with springs whereby the arms are pressed against the walls of said slots or grooves, substantially as and for the purpose set forth.

2. An expanding pulley having movable arms carrying the peripheral sections or segments, loose pieces fitted to said arms, a rotatable disk with spiral slots, with which said arms and pieces engage, and springs serving to press said arms in opposite directions in said slots against the walls thereof, substantially as and for the purpose set forth.

3. An expanding pulley having movable radial arms with peripheral sections or segments, a slotted rotatable disk with toothed periphery, and a pinion engaging therewith, a hand-wheel loosely fitted on the hub of the pulley, a worm on the hub of said wheel, a worm wheel and gearing, forming self-locking gearing for the rotatable disk, and permitting the pulley to be expanded and contracted when running and stationary, substantially as described.

J. ATWOOD WHITE.

Witnesses:
JOHN A. WIEDERSHEIM,
W. F. KIRCHER.